April 26, 1960     H. W. ETZEL ET AL     2,934,651
DOSIMETER AND METHOD OF DETERMINING RADIATION DOSE
Filed June 4, 1958
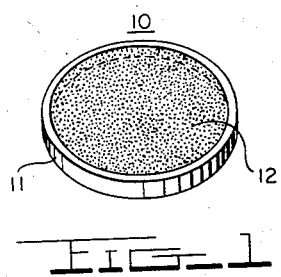
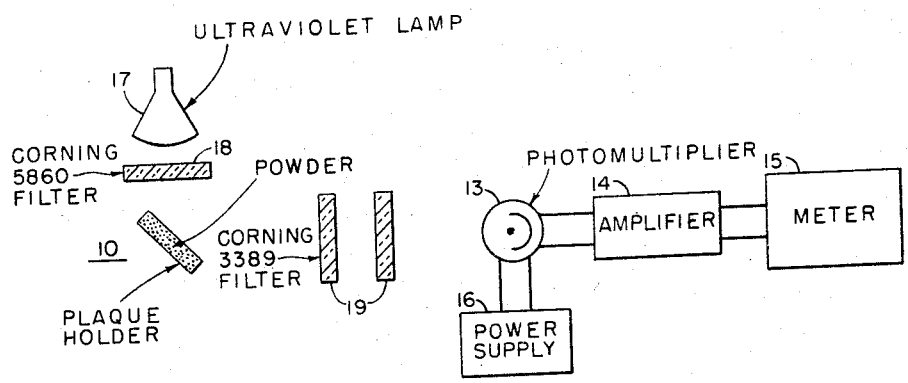
INVENTORS
JAMES H. SCHULMAN
HOWARD W. ETZEL
JAMES G. ALLARD
BY
ATTORNEYS

2,934,651

DOSIMETER AND METHOD OF DETERMINING RADIATION DOSE

Howard W. Etzel and James H. Schulman, Forest Heights, and James G. Allard, Oxon Hill, Md.

Application June 4, 1958, Serial No. 739,954

9 Claims. (Cl. 250—71)

(Granted under Title 35, U.S. Code (1952), sec. 266)

The invention described herein may be manufactured and used by or for the Government of the United States of America for governmental purposes without the payment of any royalties thereon or therefor.

The present invention relates to radiation sensitive devices and more particularly to a dosimeter and radiation dose indication device for the detection and measurement of high energy radiations such as X-rays, gamma rays, high speed electrons, etc., and to the method of using the same.

The advent of nuclear energy has added new importance to the problem of radiation measurement. Heretofore, radiation detection and measuring devices such as films, ion chambers, chemical solutions, creation of luminescence responses in solids, discoloration of glass or crystals, decomposition of certain gases and various other techniques have been used. These devices are limited in one or more respects; that is, in total dose rate and range that can be encompassed, stability of dose indication with time; dependence of response on the quality of the radiation employed, inconvenience in handling or storing, high cost, and the inability to accumulate the dose over a wide temperature range and high intensities. The present invention is an improvement in one or more respects over the aforementioned devices and method of dosimetry.

A preferred embodiment of the present invention makes use of the observed destructive effect of radiation on a photoluminescence material such as anthracene, naphthalene, terphenyl, quaterphenyl, and stilbene which is normally luminescent under ultraviolet light excitation. The luminescence of these organic solids when observed under ultraviolet light decreases in proportion to the dose of the penetrating ionizing radiation. The loss of such luminescence is permanent and in accordance to the dose of the incident penetrating radiation.

It is therefore an object of the present invention to provide a simple and inexpensive device for detecting ionizing radiation.

A further object is to provide an efficient dosimeter for detecting and measuring high energy penetrating radiation.

A still further object is to provide an efficient dosimeter for detecting and measuring high energy penetrating radiation over a wide range of temperatures in which the detecting element measures accumulative dosage and gives a permanent reading.

Other and more specific objects of the invention will become apparent upon a careful consideration of the following detailed description when taken together with the accompanying drawing in which:

Fig. 1 illustrates a radiation detecting element, and

Fig. 2 illustrates diagrammatically a system according to the present invention for measuring penetrative radiation in which the dosimeter element has been subjected.

The device according to the present invention includes a photoluminescent detecting element which is normally luminescent under ultraviolet light excitation and which decreases in photoluminescence after exposure to ionizing radiation. The decrease in photoluminescence is substantially proportional to the radiation dose received. Luminescent light from the detecting element is directed onto a light sensitive detector, such as a photomultiplier tube through a suitable filter wherein an electrical signal is generated and fed through an amplifier to a meter which indicates the amount of the dose.

Accordingly, the present invention herein disclosed includes a radiation detecting element, which after being subjected to a quantity of penetrating radiation, has the property of emitting luminescent light of an intensity functionally related to said quantity of radiation when excited by a predetermined quality and intensity of ultraviolet light. It has been determined that an organic material such as pure anthracene, naphthalene, terphenyl, quaterphenyl and stilbene can be used as a satisfactory and efficient detecting element. These organic materials can be used in the powdered form, as a pressed plaque, coated onto a support, or as a single-crystal. For economical reasons a powder or pressed plaque is most acceptable. Such organic materials are normally luminescent under ultraviolet light and it has been determined that the decrement in luminescence after exposure to ionizing radiation is in accordance to the dose of the penetrating radiation.

A dosimeter formed of one of the organic materials noted above is subjected to radiation and then after exposure compared to the luminescence of an unirradiated sample; or, an instrument such as a fluorimeter is used to determine the intensity of the luminescence which directly indicates the dose. A meter can be calibrated to directly read the dose.

When irradiated, the radiation penetrates the detector element wherein the radiation on interacting with the molecules of the element material alters the structure. Those molecules that are altered have an effect on the element material such that some molecules are rearranged into a different molecular structure which is not luminescent under ultraviolet light.

The chemical change that takes place is not precisely known. However, it has been determined that alteration of some molecules poisons the surrounding molecules such that the newly formed molecules act to capture any energy of the exciting ultraviolet light. The captured energy is dissipated as heat instead of allowing the energy to come out as luminescence light. The amount of degradation of the luminescence of the radiation detecting element under excitation of ultraviolet light is directly related to the penetrating radiation or dose. The performance of the degradation is illustrated by the fact that irradiated radiation detection elements of the present invention have been stored at room temperature for several months without any recovery of the luminescence efficiency, nor has any appreciable recovery been noted after long periods of high temperature heating at about 120° C. It has been determined that a dosimeter as described above can withstand temperatures from about −80° C. up to about 300° C. and higher for short periods without any harmful effects on its ability to determine doses of radiation such as $2 \times 10^8$ roentgens. The temperature being limited only by the melting point of the material where, in use the temperature used should be not more than within 20° of the melting point.

Referring now to the drawing wherein like numerals denote like parts, Fig. 1 discloses a radiation detecting element or dosimeter 10 made according to the present invention. The dosimeter as shown includes a base or form 11 in which a pure powdered material 12 such as naphthalene, anthracene, terphenyl, quaterphenyl, or stilbene has been pressed.

Fig. 2 illustrates a suitable reading device for measuring the dose of penetrative radiation received by the dosimeter as shown in Fig. 1. The dosimeter or radiation receiving element 10 is mounted relative to an ultraviolet lamp 17 and a photomultiplier tube 13 such that the dosimeter receives radiation from the ultraviolet lamp 17 through a suitable filter 18 to excite luminescence. The luminescent light emitted is received by the photomultiplier tube 13 through a suitable filter 19 and generates a signal at the output of the tube. The signal is fed into an amplifier 14 for amplification and then directed into a suitable radiation intensity indicating instrument 15 which is calibrated in roentgens so as to indicate directly the dose of radiation received by the dosimeter. A suitable power source 16 is provided to supply current to the photomultiplier and the amplifier in any conventional manner.

The filters used to filter the radiation from the ultraviolet lamp which excites the dosimeter and between the dosimeter and the photomultiplier depends on the material being used for the radiation detecting element. For example, when using anthracene, a Corning 5860 filter is used to filter the ultraviolet light exciting the dosimeter and a Corning 3389 filter is used to filter the luminescent light emanating from the dosimeter and directed to the photomultiplier. As shown by Fig. 2 more than one filter can be used if desired. The type and number of filters used depends on the nature of the organic material used as the dosimeter.

Dosimeters made of the organic materials disclosed above are capable of operating in temperature ranges of from $-80°$ C. up to about $300°$ C. and are capable of measuring doses from about $10^5$ to more than $2 \times 10^8$ roentgens. The maximum temperature depending on the melting point of the material.

In use of the dosimeter of the present invention, the organic material is formed into a detecting element which is then positioned in an appropriate place or attached to an object or objects which are to receive a radiation dose. The object is irradiated and then the detecting element is removed from the object and placed into the measuring system and the dosage received by the object is indicated. If an accumulative dose measurement is desired, the detecting element can be positioned again in a desired place and after a predetermined time the detecting element can be placed again into the dose measuring system and the total amount of radiation received by the detecting element can be determined.

The disclosed dosimeter provides a desired instrument for measuring a wide dose range over a wide temperature range without saturation to provide a permanent dose indication without fading. The detecting element is simple to operate and provides an inexpensive element of generally available materials.

Obviously many modifications and variations of the present invention are possible in the light of the above teachings. It is therefore to be understood that within the scope of the appended claims the invention may be practiced otherwise than as specifically described.

What is claimed is:

1. A dosimeter consisting of an organic material capable of luminescence under ultraviolet excitation and operative under penetrating ionizing radiation to indicate a degradation in luminescence under ultraviolet light in accordance with an amount of penetrating radiation, said dosimeter operative over a range of temperature of about $-80°$ C. to about $300°$ C. and at a dose range from about $10^5$ to more than $2 \times 10^8$ roentgens.

2. A dosimeter consisting of an organic material selected from the group consisting of anthracene, naphthalene, terphenyl, quaterphenyl and stilbene, said material capable of luminescence under ultraviolet light and operative under penetrating ionizing radiation to degrade in luminescence, said degradation of luminescence under ultraviolet light corresponding directly to the amount of penetrating radiation incident on said organic material and operative over a range of temperature of about $-80°$ C. to about $300°$ C. and at a dose range from about $10^5$ to more than $2 \times 10^8$ roentgens.

3. A dosimeter consisting of a pressed plaque of anthracene capable of luminescence under ultraviolet light and operative under incident penetrating ionizing radiation to degrade the luminescence under ultraviolet light in accordance to the dosage of incident penetrating radiation, said dosimeter operative over a range of temperature of about $-80°$ C. to about $200°$ C. and a dose range from about $10^5$ to more than $2 \times 10^8$ roentgens.

4. A dosimeter consisting of a pressed plaque of a quaterphenyl capable of luminescence under ultraviolet light and operative under incident penetrating ionizing radiation to degrade the luminescence under ultraviolet in accordance to the dosage of incident penetrating radiation, said dosimeter operative over a range of temperature of about $-80°$ C. to about 300 C. and a dose range from about $10^5$ to more than $2 \times 10^8$ roentgens.

5. A dosimeter as claimed in claim 3 wherein said dosimeter is operative to detect X-rays, gamma rays or high speed electrons.

6. A dosimeter as claimed in claim 4 wherein said dosimeter is operative to detect X-rays, gamma rays or hiyh speed electrons.

7. A radiation dose indicating device which comprises an organic material radiation detecting element capable of luminescence under ultraviolet illumination and operative under incident penetrating ionizing radiation to degradate in luminescence under ultraviolet light in accordance with the amount of incident radiation, means for exciting luminescence of said detecting element, electrically responsive photosensitive means positioned relative to said detecting element to receive luminescent light under ultraviolet light emitted therefrom, and means adapted to measure a signal produced by said photosensitive means which corresponds to the amount of luminescent radiation under ultraviolet light emitted from said detecting element in accordance to the amount of radiation received by said detecting element.

8. A method of determining the amount of ionizing radiation incident on an object which comprises positioning in the path of ionizing radiation a dosimeter formed from an organic material capable of luminescence under ultraviolet light and operative under incident ionizing radiation to degradate in luminescence, removing the dosimeter from the path of radiation, placing the dosimeter in the path of ultraviolet light, measuring the amount of degradation of the luminescence under said ultraviolet light and comparing the amount of degradation with that of an unirradiated sample of said organic material.

9. A method of determining the amount of ionizing radiation incident on an object which comprises positioning in the path of ionizing radiation a dosimeter formed of a pressed plaque of powdered anthracene capable of luminescence under ultraviolet excitation and operative to degradate in luminescence under incident ionizing radiation, removing said dosimeter from the path of ionizing radiation, placing the dosimeter in the path of ultraviolet light measuring the amount of degradation in luminescence under said ultraviolet light and determining the amount of incident ionizing radiation by comparing the amount of luminescence degradation with that of the dosimeter before irradiation.

References Cited in the file of this patent

UNITED STATES PATENTS

| | | |
|---|---|---|
| 2,730,625 | Schurcliff | Jan. 10, 1956 |
| 2,783,386 | Mandeville et al. | Feb. 26, 1957 |